Feb. 9, 1937.  J. A. ZUBLIN  2,069,796
REAMING TOOL
Filed June 22, 1936   2 Sheets-Sheet 1
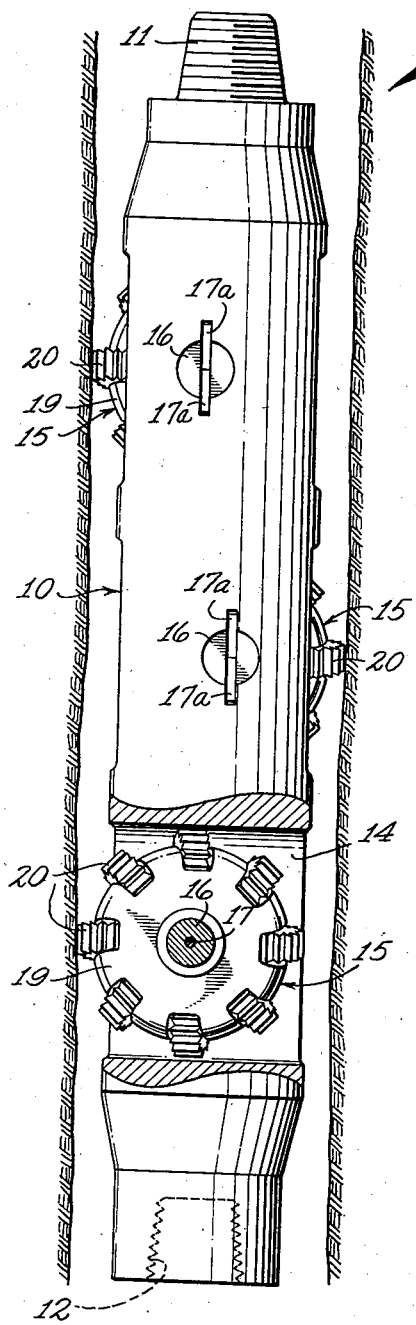
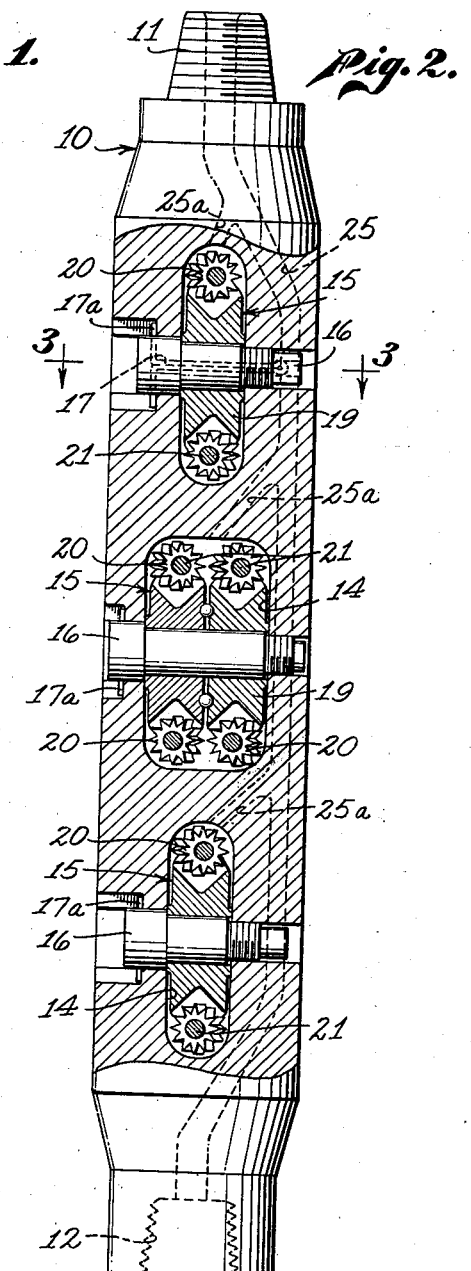
Inventor
John A. Zublin
By J. W. Rodgers
Attorney Feb. 9, 1937.   J. A. ZUBLIN   2,069,796
REAMING TOOL
Filed June 22, 1936   2 Sheets-Sheet 2
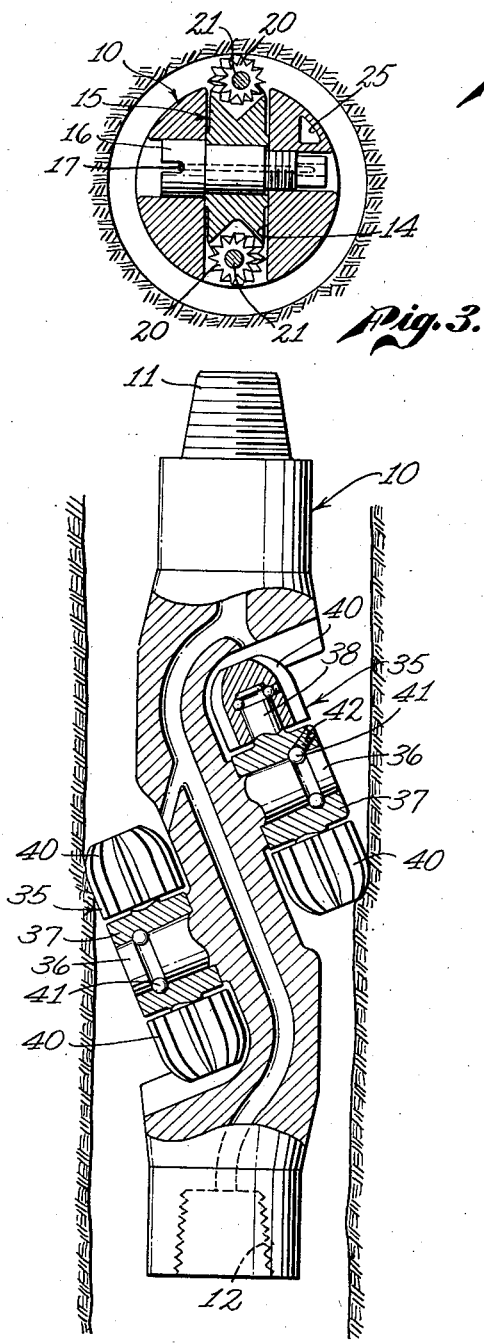
Fig. 3.
Fig. 5.
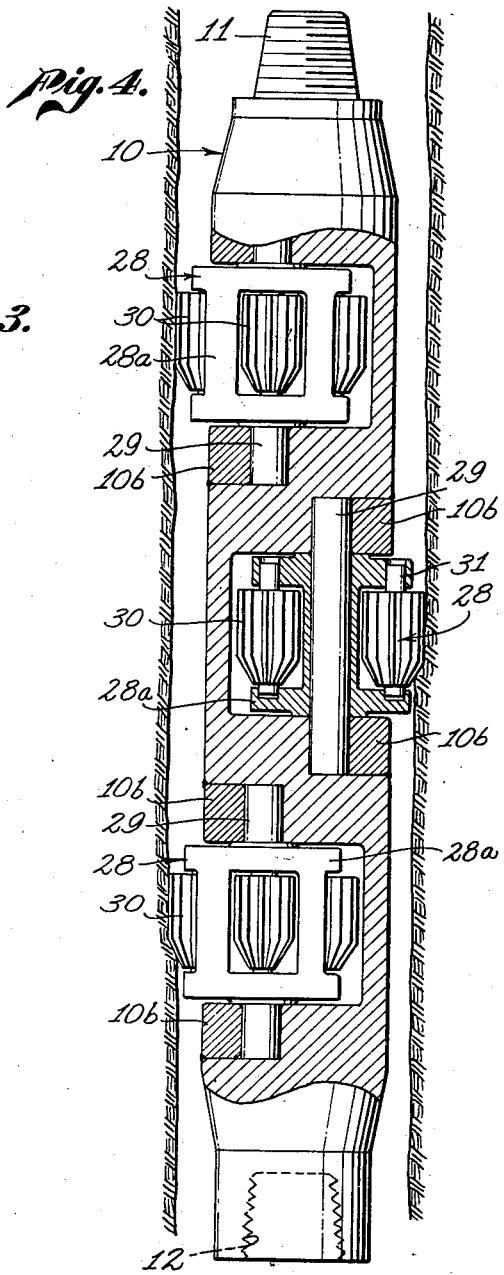
Fig. 4.
Inventor
John A. Zublin
By
J. W. Rodgers
Attorney Patented Feb. 9, 1937

2,069,796

UNITED STATES PATENT OFFICE 2,069,796

REAMING TOOL

John A. Zublin, Los Angeles, Calif.

Application June 22, 1936, Serial No. 86,687

11 Claims. (Cl. 255—73)

While the present invention relates generally to oil well tools, it is more especially concerned with reaming tools adapted to operate in rock and other relatively hard formations. Tools of this type are generally used to enlarge an already drilled hole and may be used alone or in conjunction with a drill bit that is used to drill new holes.

For reasons that are well known in the art, oil well tools used successfully in rock and other hard formations nearly always have rotating cutters, since they produce the best kind of drilling motion. However, there are conflicting requirements for best design. To secure the maximum penetration of the cutters, it is necessary to have only a minimum portion of the cutters in contact with the formation at any one time, as higher pressure per unit area increases the penetration of the teeth. On the other hand, to give a long life to the tool and keep down the cost of drilling, it is necessary to provide a maximum of cutting teeth on the tool, since the life of the tool is generally proportional to the total number and size of cutting teeth available to cut the formation, and an increase in the total number of teeth is usually accompanied by a like increase in the number of teeth cutting at one time.

It becomes apparent that the ideal tool has a large total amount of cutting surface, but has only a small part of that surface "active" or in drilling contact at any one time, the remainder of the cutting surface being, in effect, "in reserve", since it does its share of the cutting after the first "active" portion moves out of contact with the formation. In reaming tools of conventional types using roller cutters, all the cutters are generally in simultaneous engagement with the formation, so the "reserve" cutting surface is limited to that portion of each cutter not so engaged, and amounts to but a few, perhaps three or four, times the "active" cutting surface, whereas an increase in the ratio between "reserve" and "active" portions increases both the efficiency and life of the tool.

If a member rotatable about an axis on a tool is brought into contact with the formation, and the tool as a whole is rotated, there is a natural tendency for the member to rotate about its own axis on the tool. This natural tendency is strong and positive, and will move cutters mounted on the rotatable member into and out of cutting engagement with the formation, and so bring entire cutters intermittently into active position from reserve.

I is a general object of my invention both to decrease the amount of active cutting area which is at any one time in cutting position, and to increase the amount of reserve area, with a view to increasing the drilling rate of the tool and lengthening the life of the tool.

It is also an object of the invention to provide a reamer which, in addition to the usual reserve cutting area on each cutter, has a sufficiently large number of cutters that several entire cutters are in reserve, and are, as a whole, successively brought into cutting position and then returned to the non-cutting position.

Another object is to provide a reaming tool with the above characteristics in which the roller cutters contact the formation with a substantially true rolling motion, throughout all or substantially all, of their engagement with the formation, so that they operate with maximum efficiency.

It is another object of my invention to provide a reaming tool with a plurality of rotatable cutter carriers rotated by their natural tendency to turn when in contact with the formation, and bringing successive cutters intermittently into cutting contact with the formation.

It is a further object to provide a reaming tool with different styles and types of rolling cutters mounted in different positions and at different angles upon rotating carriers, to provide most suitable types of cutting motions.

These objects are attained in a reaming tool constructed according to my invention by providing a tool body with a plurality of cutter carriers rotatably mounted at positions longitudinally spaced along the body. Each of these cutter carriers has a plurality of cutters rotatably mounted upon it. These carriers are preferably offset somewhat from the longitudinal axis of the body, so that the cutters of each carrier contact the formation at only one side of the tool body.

Drill bits embodying my invention are shown in my copending cases entitled "Drill bit with rolling cutters", Ser. No. 56,252, filed December 26, 1935, now Patent No. 2,050,989, and "Rotary drill bit with rolling cutters", Ser. No. 71,600, filed March 30, 1936, now Patent No. 2,050,988, and these earlier cases contain claims to subject matter common to all three cases, the claims in the present case being directed to matter peculiar to this case alone.

How the above and other objects and advantages of my invention are attained will be more readily apparent by reference to the following description and annexed drawings, in which:

Fig. 1 is a side view, partially broken away, of a reaming tool constructed according to my invention;

Fig. 2 is a vertical section through the reaming tool;

Fig. 3 is a horizontal section on line 3—3 of Fig. 2;

Fig. 4 is a vertical section through a variational form of reaming tool; and

Fig. 5 is a vertical section through another form of reaming tool.

Referring to Figs. 1 and 2, there is shown a reaming tool comprising a body 10 provided at its upper end with a threaded pin 11, by means of which the body is attached to a drill stem for rotation about the longitudinal axis of the body. The lower end of the body is provided with an internally threaded box 12 to which other tools may be attached below the reamer. Body 10 has a number of transverse openings 14 spaced longitudinally of the body and of a suitable size and shape to receive one or more cutter assemblies, generally indicated at 15. Cutter assemblies 15 are rotatably mounted on body 10 to rotate about transverse axes by means of shafts 16. Each shaft 16 provides a bearing for one of the carriers, and is threaded at one end which engages body 10 to hold the shaft against longitudinal displacement. Shaft 16 is held against rotation after it is properly in place by means of cotter key 17 extending lengthwise inside the shaft, the ends 17a of the key being bent outwardly to engage slots in the reamer body.

Each cutter assembly 15 comprises a circular wheel-like body 19 upon which a plurality of roller cutters 20 are rotatably mounted. As may be seen in Fig. 2, each of the cutters is mounted on an axle pin 21 secured at its ends to the carrier by any suitable means, preferably by welding. The shape and tooth arrangement of the roller cutters may be of any suitable design adapted to the formation which is being reamed; but when the carriers are mounted on transverse axes, as in Figs. 1 and 2, it is preferred that axle pins 21 be inclined to the plane of the carrier, and also to the axis of carrier rotation, in such a way that as body 10 turns the rollers will have a natural tendency to roll in a downwardly inclined path over the formation, as may be seen in Fig. 1. This inclination of the cutters helps to rotate the carrier about its own axis. Additional details of construction and variational forms of the cutter assembly are shown in my copending cases above referred to.

The carriers as a whole are transversely offset from the longitudinal axis of body 10 so that the cutters of any one carrier come into contact with the formation on only one side of the tool body. Since there must be at least two points of contact of the reamer with this formation in order to hold the cutters against the side walls, it is convenient to offset two of the carriers in opposite directions so that they contact the hole on diametrically opposite sides of the tool body. It is preferred, however, to have at least three points of contact along the length of the reamer, since this arrangement produces a straighter hole and insures reaming to full gauge, and, if desired, the carriers may then be located at intervals of 120 degrees around the cutter body. With the arrangement here shown, four cutter assemblies are used, the one at the top and the one at the bottom projecting on the same side of the body, and the two in the center projecting at the opposite side of the body. Although one carrier might be used in the center, two carriers are used in order to provide the same amount of cutting surface on both sides of the reamer.

Passage 25 extends longitudinally through body 10 to conduct circulation fluid to the bottom of the well, and is provided with branch passages 25a that discharge circulation fluid onto cutters 20 to keep them clean.

In Fig. 4 is shown a variational form of reaming tool embodying the same general principles of construction. Body 10 is provided with a plurality of cutter carriers generally indicated at 28 which are rotatably mounted in the body on longitudinally extending shafts 29. In order to insert shafts 29 within the body, body portions 10b are made removable, and after the shafts and carrier assemblies are in place, the blocks 10b are welded or otherwise suitably secured to the body.

Each of the cutter assemblies 28 comprises a circular body 28a which revolves about an axis parallel to the longitudinal axis of body 10, and has rotatably mounted upon it a plurality of cutters 30 which revolve about axes parallel to the cutter axis. As shown on the center carrier on Fig. 4, each cutter 30 is mounted to turn about a pin 31 inserted from the top of the carrier and seated in the bottom portion of the carrier, the pin being welded or otherwise secured to the top portion of the carrier to hold it in place.

Carriers 29 are spaced longitudinally along the reamer body and are offset transversely from the longitudinal body axis, in the same way as already described, so that they contact the formation on only one side of the body, and the several carriers mutually react to the cutting thrust. It will be understood that the number and arrangement of carriers may be changed as desired, and that the shape and tooth formations on the cutters may be altered to meet various drilling conditions.

Another variational form of reamer is shown in Fig. 5 and comprises a body 10 having a pair of cutter assemblies, generally indicated at 35. The tool body is provided with a pair of integral studs 36 inclined to the longitudinal body axis of the tool and upon each of which one of the assemblies 35 is rotatably mounted. Each cutter assembly 35 comprises an annular body 37 with a number of radial bearings 38 with a toothed cutter 40 mounted on each bearing.

The cutter assemblies are held in place on bearings 36 by means of a number of balls 41 held in two matching annular grooves, one in the bearing 36 and one in carrier body 37. The balls are held against displacement after insertion into the grooves by screw plug 42 which is then tack welded to hold it in place. Each cutter 40 is retained in position on its bearing 38 by means of a similar arrangement.

It will be noted that the lower cutters of the upper assembly, and the uper cutters of the lower assembly come in cutting engagement with the formation. It is preferred that the two cutter assemblies be so spaced longitudinally of the reamer body that the points of contact of the two carriers are approximately at the same level, in which case it is not necessary to use more than two carrier asemblies, although additional pairs may be provided upon the same body or three assemblies may be used as in the other reamers described. With the construction shown in Fig. 5 it will be noted that the carriers 37 rotate about axes inclined to the longitudinal axis of the body, while the cutters 40 rotate about radial axes perpendicular to the carrier axes.

It will be understood that changes may be made in the construction and the arrangement of the various parts without departing from the spirit and scope of my invention, and it is therefore to be understood that the appended claims are illustrative of rather than restrictive upon the broad scope of my invention.

I claim as my invention:

1. In a rotary well reaming tool, the combination of a body adapted to attachment to a drill stem for rotation about a longitudinal axis, a plurality of cutter carriers rotatably mounted on the body in longitudinally spaced positions, and a plurality of cutters rotatably mounted on each of the carriers.

2. In a rotary well reaming tool, the combination of a body adapted to attachment to a drill stem for rotation about a longitudinal axis, a plurality of cutter carriers rotatably mounted on the body in longitudinally spaced positions, and a plurality of cutters rotatably mounted on each of the carriers, the carriers also being offset from the longitudinal axis of the tool so that cutters of each carrier contact the formation on only one side of the tool body.

3. In a rotary well reaming tool, the combination of a body adapted to attachment to a drill stem for rotation about a longitudinal axis, a plurality of cutter carriers roatably mounted on the body in longitudinally spaced positions for rotation about fixed axes, and a plurality of cutters rotatably mounted on each of the carriers, the carriers also being offset from the longitudinal axis of the tool and from each other so that the several carriers simultaneously contact the hole at various points around the tool body.

4. In a rotary well reaming tool, the combination of a body adapted to attachment to a drill stem for rotation about a longitudinal axis, a plurality of cutter carriers rotatably mounted on the body to rotate about fixed, longitudinally spaced axes, and a plurality of cutters rotatably mounted on each of the carriers.

5. In a rotary well reaming tool, the combination of a body adapted to attachment to a drill stem for rotation about a longitudinal axis, a plurality of cutter carriers rotatably mounted on the body in a longitudinally spaced positions to turn about transverse axes, and a plurality of cutters rotatably mounted on each of the carriers.

6. In a rotary well reaming tool, the combination of a body adapted to attachment to a drill stem for rotation about a longitudinal axis, a plurality of cutter carriers rotatably mounted on the body in longitudinally spaced positions to turn about transverse axes, and a plurality of cutters rotatably mounted on each of the carriers to rotate about axes inclined to the carrier axes.

7. In a rotary well reaming tool, the combination of a body adapted to attachment to a drill stem for rotation about a longitudinal axis, a plurality of cutter carriers rotatably mounted on the body in longitudinally spaced positions to turn about axes parallel to the longitudinal tool axis, and a plurality of cutters rotatably mounted on each of the carriers.

8. In a rotary well reaming tool, the combination of a body adapted to attachment to a drill stem for rotation about a longitudinal axis, a plurality of cutter carriers rotatably mounted on the body in longitudinally spaced positions to turn about axes parallel to the longitudinal tool axis, and a plurality of cutters rotatably mounted on each of the carriers to rotate about axes parallel to the carrier axes.

9. In a rotary well reaming tool, the combination of a body adapted to attachment to a drill stem for rotation about a longitudinal axis, a plurality of cutter carriers rotatably mounted on the body in longitudinally spaced positions to turn about inclined axes, and a plurality of cutters rotatably mounted on each of the carriers.

10. In a rotary well reaming tool, the combination of a body adapted to attachment to a drill stem for rotation about a longitudinal axis, a plurality of cutter carriers rotatably mounted on the body in longitudinally spaced positions to turn about inclined axes, and a plurality of cutters rotatably mounted on each of the carriers to rotate about inclined axes perpendicular to the carrier axes.

11. In a rotary well reaming tool, the combination of a body adapted to attachment to a drill stem for rotation about a longitudinal axis, a plurality of cutter carriers rotatably mounted on the body in longitudinally spaced positions, a plurality of cutters rotatably mounted on each of the carriers, and a circulation fluid passage extending longitudinally through the tool body with branch passages conducting fluid to the cutters.

JOHN A. ZUBLIN.